(12) United States Patent
Cheng et al.

(10) Patent No.: US 11,524,596 B2
(45) Date of Patent: Dec. 13, 2022

(54) MONITORING SYSTEM, BASE STATION AND CONTROL METHOD OF A DRONE

(71) Applicant: Coretronic Intelligent Robotics Corporation, Hsinchu County (TW)

(72) Inventors: Hsu-Chih Cheng, Hsinchu County (TW); Ying-Chieh Chen, Hsinchu County (TW); Chi-Tong Hsieh, Hsinchu County (TW); I-Ta Yang, Hsinchu County (TW)

(73) Assignee: Coretronic Intelligent Robotics Corporation, Hsin-Chu (TW)

( * ) Notice: Subject to any disclaimer, the term of this patent is extended or adjusted under 35 U.S.C. 154(b) by 722 days.

(21) Appl. No.: 16/402,225

(22) Filed: May 2, 2019

(65) Prior Publication Data

US 2020/0001735 A1 Jan. 2, 2020

(30) Foreign Application Priority Data

Jul. 2, 2018 (CN) .......................... 201810705841.0

(51) Int. Cl.
*B60L 53/36* (2019.01)
*B60L 53/65* (2019.01)
(Continued)

(52) U.S. Cl.
CPC ............... *B60L 53/36* (2019.02); *B60L 53/16* (2019.02); *B60L 53/51* (2019.02); *B60L 53/65* (2019.02);
(Continued)

(58) Field of Classification Search
CPC ........ B60L 53/36; B60L 53/61; G08G 5/0091
(Continued)

(56) References Cited

U.S. PATENT DOCUMENTS 10,124,912 B2 * 11/2018 Walsh .................. G05D 1/0202
10,488,512 B1 * 11/2019 Pounds ..................... B64F 1/00
(Continued)

FOREIGN PATENT DOCUMENTS

| CN | 104102248 | 10/2014 |
| CN | 105539824 | 5/2016 |

(Continued)

OTHER PUBLICATIONS

"Office Action of China Counterpart Application", dated Apr. 26, 2022, p. 1-p. 16.

*Primary Examiner* — Suchin Parihar
(74) *Attorney, Agent, or Firm* — JCIPRNET

(57) ABSTRACT

This disclosure provides a monitoring system, a base station, and a control method of drones. The drone includes a battery that supplies electric power for the drone and that connects with a charging connector. The base station includes a charging device, and the charging device includes a power supply connector, a power supply, and a power controller. The power supply connector is used for connecting to the charging connector. The power supply provides electric power. The power controller is coupled to the power supply and the power supply connector. The power controller is used to determine the battery specification of the battery and charge the battery from the power supply according to the battery specification. Thereby, the charging efficiency can be improved and the charging abnormality can be avoided.

27 Claims, 15 Drawing Sheets

(51) Int. Cl.
    *B60L 53/16* (2019.01)
    *B60L 53/51* (2019.01)
    *G08G 5/02* (2006.01)
    *G08G 5/00* (2006.01)
    *B64C 39/02* (2006.01)

(52) U.S. Cl.
    CPC ......... *B64C 39/024* (2013.01); *G08G 5/0091* (2013.01); *G08G 5/025* (2013.01); *B64C 2201/042* (2013.01); *B64C 2201/18* (2013.01)

(58) Field of Classification Search
    USPC .......................................................... 320/109
    See application file for complete search history.

(56) References Cited

U.S. PATENT DOCUMENTS

| | | | |
|---|---|---|---|
| 2017/0111228 A1 | 4/2017 | Obaidi et al. | |
| 2017/0320570 A1 | 11/2017 | Horn | |
| 2018/0029723 A1 | 2/2018 | Krauss et al. | |
| 2018/0072170 A1 | 3/2018 | Evans | |
| 2018/0101173 A1* | 4/2018 | Banerjee | G05D 1/0094 |
| 2018/0327091 A1* | 11/2018 | Burks | B64C 39/10 |
| 2018/0366955 A1* | 12/2018 | Rikoski | H02J 7/0024 |
| 2019/0172348 A1* | 6/2019 | Rivers | G05D 1/0094 |
| 2020/0207230 A1* | 7/2020 | Evans | B60L 53/66 |
| 2020/0239135 A1* | 7/2020 | Cheng | B64C 39/02 |
| 2020/0239160 A1* | 7/2020 | Cheng | B64C 39/024 |
| 2020/0310465 A1* | 10/2020 | Garth | B64C 39/024 |
| 2021/0031947 A1* | 2/2021 | Wankewycz | B64D 27/24 |

FOREIGN PATENT DOCUMENTS

| | | |
|---|---|---|
| CN | 105951614 | 9/2016 |
| CN | 106005463 | 10/2016 |
| CN | 106209206 | 12/2016 |
| CN | 106542109 | 3/2017 |
| CN | 206023324 | 3/2017 |
| CN | 107078528 | 8/2017 |
| CN | 107355983 | 11/2017 |
| CN | 107640079 | 1/2018 |
| CN | 107672463 | 2/2018 |
| CN | 207242062 | 4/2018 |
| CN | 108657455 | 10/2018 |
| CN | 108674291 | 10/2018 |
| EP | 3333064 | 6/2018 |
| TW | 201532006 | 8/2015 |
| WO | 2018107562 | 6/2018 |

* cited by examiner

MONITORING SYSTEM, BASE STATION AND CONTROL METHOD OF A DRONE

CROSS-REFERENCE TO RELATED APPLICATION

This application claims the priority benefit of China application serial no. 201810705841.0, filed on Jul. 2, 2018. The entirety of the above-mentioned patent application is hereby incorporated by reference herein and made a part of this specification.

BACKGROUND

1. Field of the Disclosure

This disclosure is related to monitoring technology, and especially related to a monitoring system, a base station, and a control method of a drone.

2. Description of Related Art

Monitoring technologies used in various industries may monitor equipments, buildings, or other assets. Research departments may monitor animals or ecologies, and governmental administrations may monitor roads, parks, entrances or exits. There are many methods to monitor. For example, referring to FIG. 1A, for a monitoring method by human, the security personnel are hired to patrol the monitoring points at regular times for area monitoring. Alternatively, referring to FIG. 1B, some fixed cameras are disposed at the monitoring area, to send real-time images to the monitoring center, so that a remote monitoring is achieved. With respect to the area monitoring where the security personnel are needed, the monitoring convenience and the response mechanism in case of an abnormality may be restricted. For example, the visual field is limited since the visibility ranges of the monitoring personnel are limited, and the monitoring effect when the area to be monitored is large is thus limited. The terrain which may be monitored may be restricted since the monitoring personnel may only walk over roads, and areas such as upper air, deep caves, broken bridges, and rivers where are difficult to be reached may not be effectively monitored. The environments where harmful factors (such as high temperature, harmful gases, large amounts of suspended particles, high-decibel noise and other harmful factors) may exist are not suitable to be monitored by a monitoring personnel. The personnel cost may be more remarkable when the monitoring area is larger since more monitoring personnel are needed. Since the monitoring personnel may only move on roads, the real time efficiency may thus be compromised since the monitoring personnel may not be able to arrive at the site where an abnormal situation occurs timely and quickly.

Considering the above non-preferable factors in human monitoring, now an automated monitoring method is developed. Automated monitoring equipment may be installed at a specific place for environmental monitoring. Automated monitoring equipment may include drones and charging devices. However, the current automated monitoring equipment still has the following problems. For example, the stability of a drone during landing may be compromised since an external crosswind may affect the process of landing onto a charging device. The charging functions may not be various and the charging function may be limited to be performed in only one charging mode. There may also be a risk of short circuit during charging. Automated monitoring equipment may not operate well in extremely cold areas or high temperature areas, thus causing in a poor ability to resist a harsh environment. Automated monitoring equipment may not be adjusted according to various and changeable environments, thus causing in a poor ability to be operated in a changing environment. The working duration of the automated monitoring equipment may be limited by the capacity thereof since the electricity stored in the automated monitoring equipment may be exhausted.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

This disclosure is directed to a monitoring system, a base station and a control method for a drone, and provides a solution to various problems existing in the current automated monitoring device.

Other objective and advantages of the present disclosure may be further understood from the technical features disclosed herein.

In order to achieve one, a portion or all of the above or other objectives, in accordance with an embodiment of the present disclosure, the monitoring system includes a drone and a base station. The drone includes a battery, which supplies electric power for the drone and connects with a charging connector. The base station includes a charging device, and the charging device includes a power supply connector, a power supply, and a power controller. The power supply connector is used for connecting to the charging connector. The power supply provides electric power. The power controller is coupled to the power supply and the power supply connector. The power controller is used to determine the battery specification of the battery and charge the battery from the power supply according to the battery specification.

In order to achieve one, a portion or all of the above or other objectives, in accordance with an embodiment of the present disclosure, the base station includes a charging device, and the charging device includes a power supply connector, a power supply, and a power controller. The power supply connector is used for connecting to a charging connector of a drone. The power supply provides electric power. The power controller is coupled to the power supply and the power supply connector. The power controller is used to determine the battery specification of the battery of the drone and charge the battery from the power supply according to the battery specification.

In order to achieve one, a portion or all of the above or other objectives, in accordance with an embodiment of the present disclosure, a control method is adapted for a base station.

The control method includes the following steps. The battery specification of a battery of a drone is determined. The battery of the drone is charged according to the battery specification.

Based on the above, in the embodiments of the present disclosure, the drone is assisted to land by using a positioning device. Based on the battery specification of the drone, a charging polarity and a power characteristic are adjusted, and a charging protection is provided. The temperature may be adjusted by adjusting a fan and/or a heating device based on the inner environment of the base station. The patrol parameters of a drone may be automatically adjusted based on the external environment. The electric power is more adequately provided. Therefore, the reliability during the automated monitoring may be improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1A:
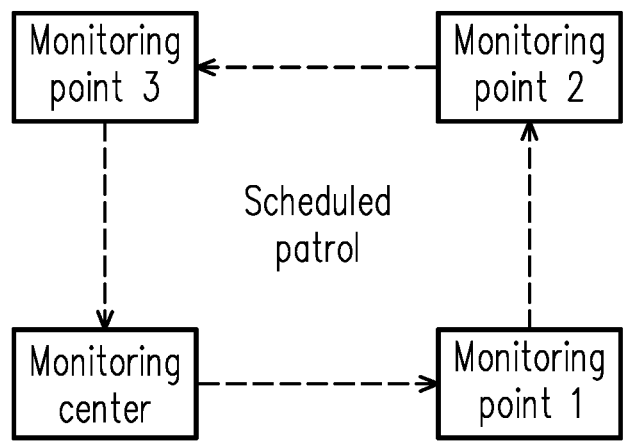
FIGS. 1A and 1B are schematic views of a monitoring method by a human.
Figure 1B:
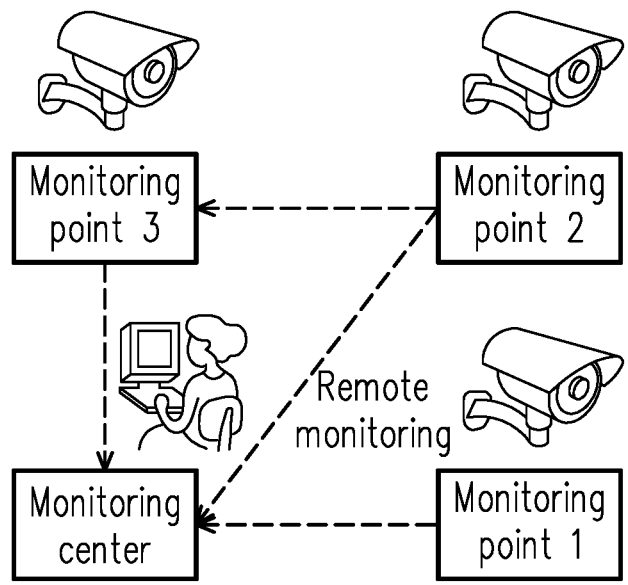
Figure 2A:
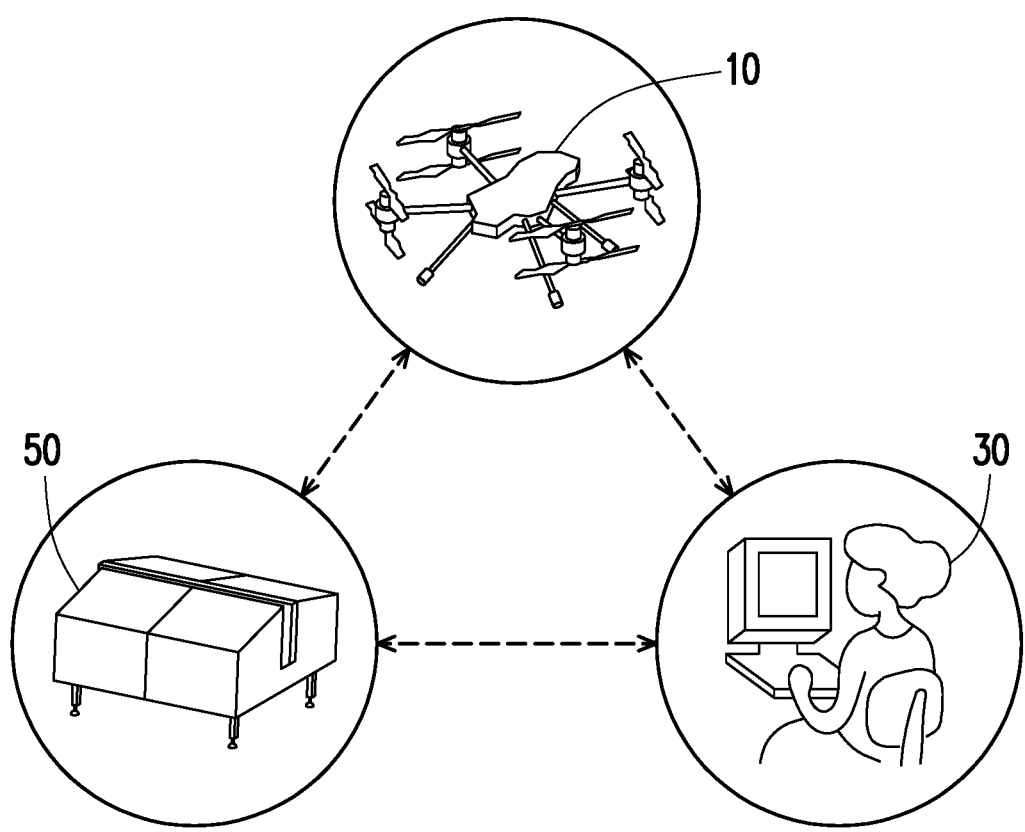
FIG. 2A is a schematic diagram of a monitoring system in accordance with an embodiment of the present disclosure.
Figure 2B:
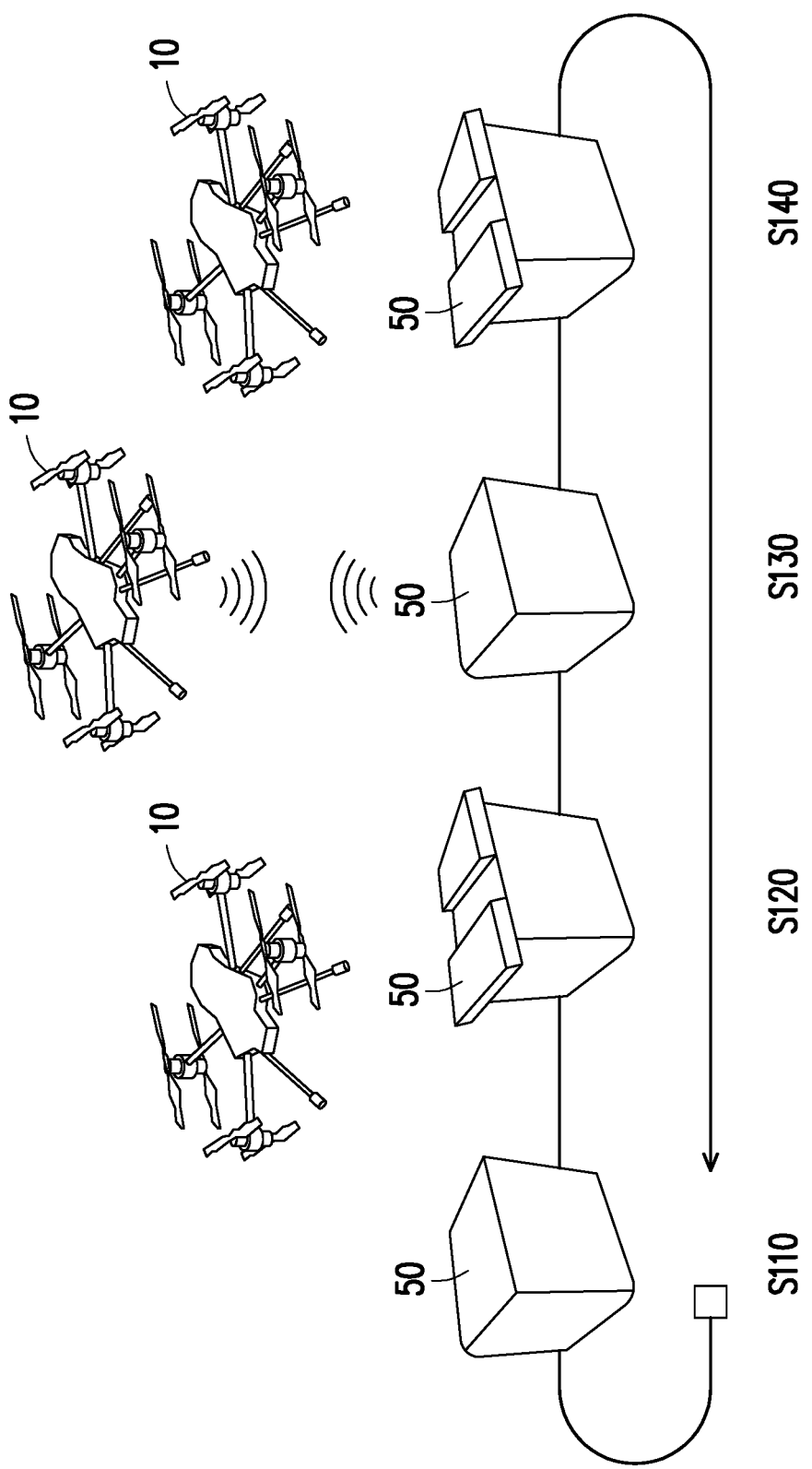
FIG. 2B is a schematic diagram of an automated monitoring system according to an embodiment of the present disclosure.

FIG. 2A is a schematic diagram of a monitoring system 1 in accordance with an embodiment of the present disclosure. Referring to FIG. 2A, the monitoring system 1 includes, at least but not limited to, a drone 10, a monitor server 30, and a base station 50. FIG. 2B is a schematic diagram of an automated monitoring method in accordance with an embodiment of the present disclosure. In order to avoid human factors, in the monitoring system and the monitoring method of the embodiment of the present disclosure, the monitoring system could be installed at a specific place for environmental monitoring. The monitoring system 1 may include the drone 10 and the base station 50 having a charging device. When the drone 10 performs automated monitoring of the area, the drone 10 repeats the two operational processes of patrol detecting and recharging after returning. As shown in FIG. 2B, the drone 10 is located at the base station 50 (step S110). After the battery of the drone 10 is fully charged, protective covers of the base station 50 are automatically opened, so that the drone 10 can fly out for patrol detection (step S120). The drone 10 returns and the protective covers of the base station 50 is notified to open (step S130). After the drone 10 has been landed at the base station 50, the protective covers of the base station 50 are closed and the drone 10 is charged (step S140).

Figure 3:
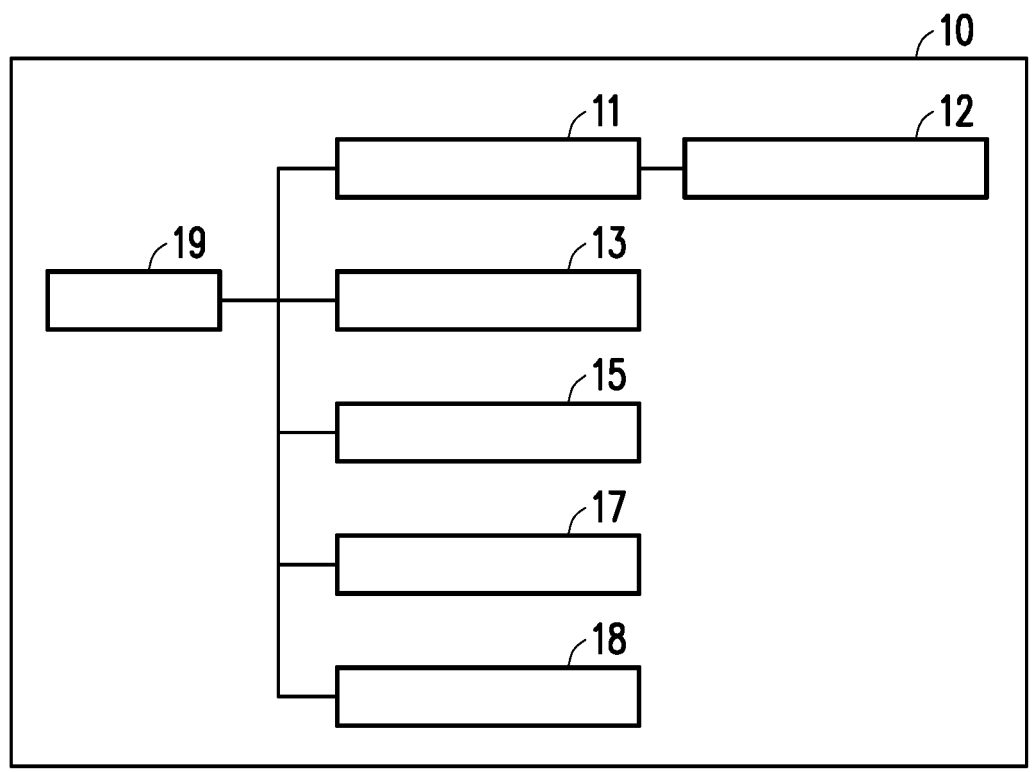
FIG. 3 is a block diagram of components of a drone according to an embodiment of the present disclosure.

Referring to FIG. 3, the drone 10 includes at least but not limited to a battery 11, a charging connector 12, a sensor 13, a communication transceiver 15, a satellite locator 17, an infrared emitter 18, and a processor 19.

The battery 11 may be a lithium battery, a fuel battery, a nickel cadmium battery, a nickel hydride battery, or other rechargeable batteries, and the battery 11 is not limited thereto.

The charging connector 12 may be a metal terminal, a jack, a pin header, a plug, or other various types of connector. In this embodiment, the metal terminal is used for charging in a contact manner.

The sensor 13 may be various sensors for detecting, for example, temperature, image, air pressure, humidity, and the like.

The communication transceiver 15 could be a transceiver that supports wireless communication technology such as Wi-Fi, fourth generation (4G) or further generations of mobile communication.

The satellite locator 17 may be a receiver supporting a satellite positioning system such as a Beidou satellite navigation system, a Global Positioning System (GPS), or a Galileo positioning system.

The infrared emitter 18 is used to emit infrared lights.

The processor 19 is coupled to the battery 11, the sensor 13, the communication transceiver 15, the satellite locator 17, and the infrared emitter 18. The processor 19 may be a central processing unit (CPU), a microcontroller, chip programmable controller, Application-Specific Integrated Circuit (ASIC), Field Programmable Gate Array (FPGA) or other similar components, or combinations of the above components.

The monitoring server 30 could be a desktop computer, a notebook computer, a workstation, or various types of servers. In the embodiment of the present disclosure, the monitoring server 30 has a communication transceiver the same as or compliant with the communication transceiver 15 of the drone 10, for receiving electrical signals from the drone 10. In some embodiments, the monitoring server 30 further includes an input device (e.g., a keyboard, a mouse, a touch screen, etc.) and a display (e.g., a Liquid-Crystal Display (LCD), a light-emitting diode (LED), an organic light-emitting diode (OLED), etc.), with which a monitoring personnel may control the drone 10 and monitor the image recorded by the drone 10.

Figure 4:
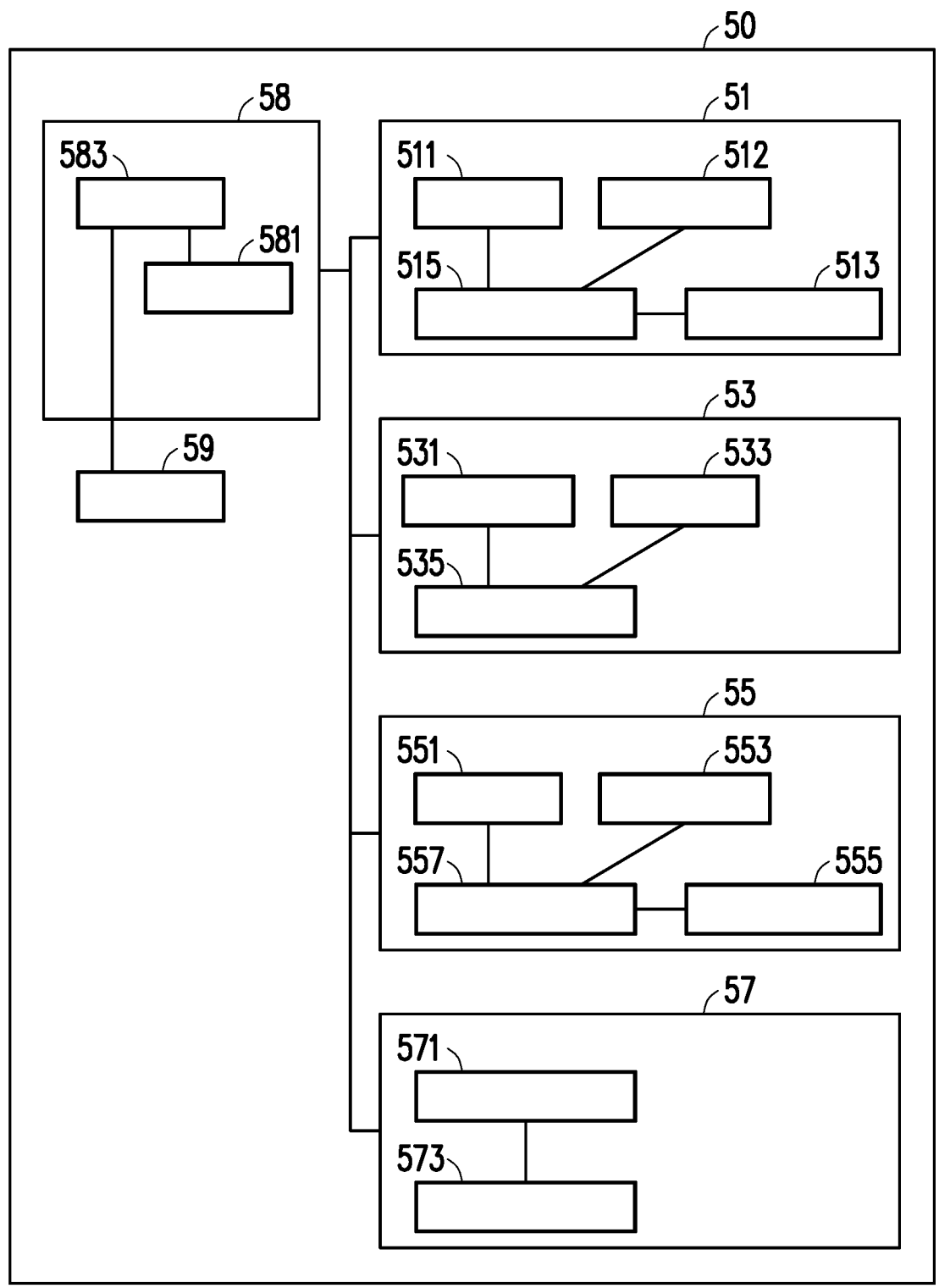
FIG. 4 is a block diagram of components of a base station in accordance with an embodiment of the present disclosure.
Figure 5A:
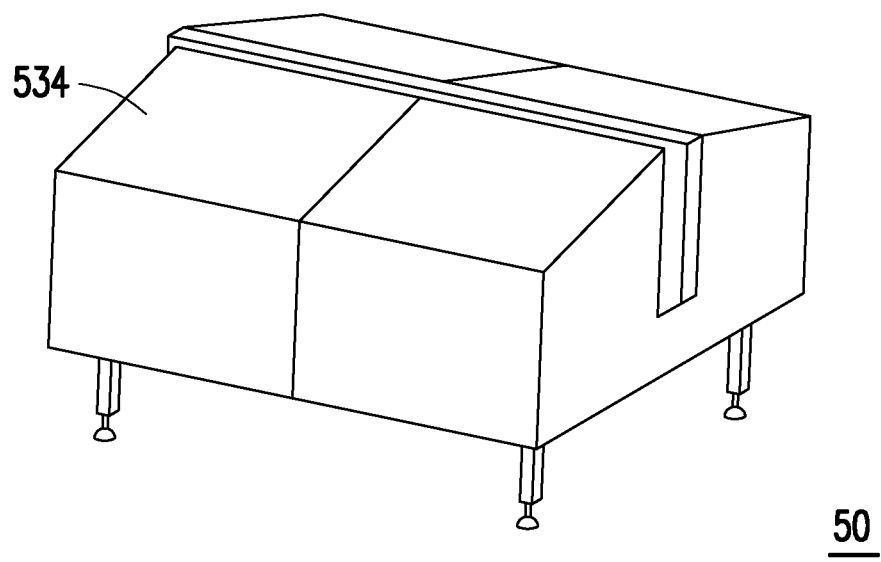
FIGS. 5A-5E is schematic diagrams of base stations in accordance with embodiments of the present disclosure.
Figure 5B:
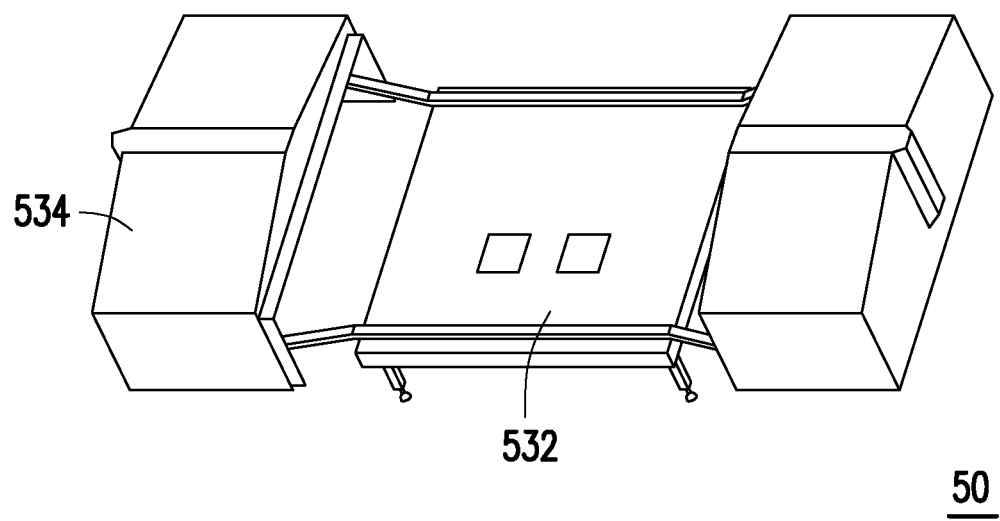

Referring to FIG. 4, the base station 50 includes, at least but not limited to, a charging device 51, a positioning device 53, a temperature control system 55, an environmental monitoring system 57, a control device 58, and a communication transceiver 59. Referring to FIGS. 5A and 5B, which are schematic diagrams of the base station 50, the base station 50 has a platform 532 disposed at the main body of the base station 50. Protective covers 534 are disposed on the main body of the base station 50 and may be laterally moved relative to the platform 532 (a lateral direction is defined as left or right directions in FIG. 5B). When the two protective covers 534 are closed (as shown in FIG. 5A), an inner space is formed inside by the surrounding main body of the base station 50, the platform 532 and the protective covers 534, so that the drone 10 located in the inner space would not be affected from outside. When the two protective covers 534 are opened (as shown in FIG. 5B), the platform 532 is exposed, so that the drone 10 may leave from the platform 532.

Figure 5C:
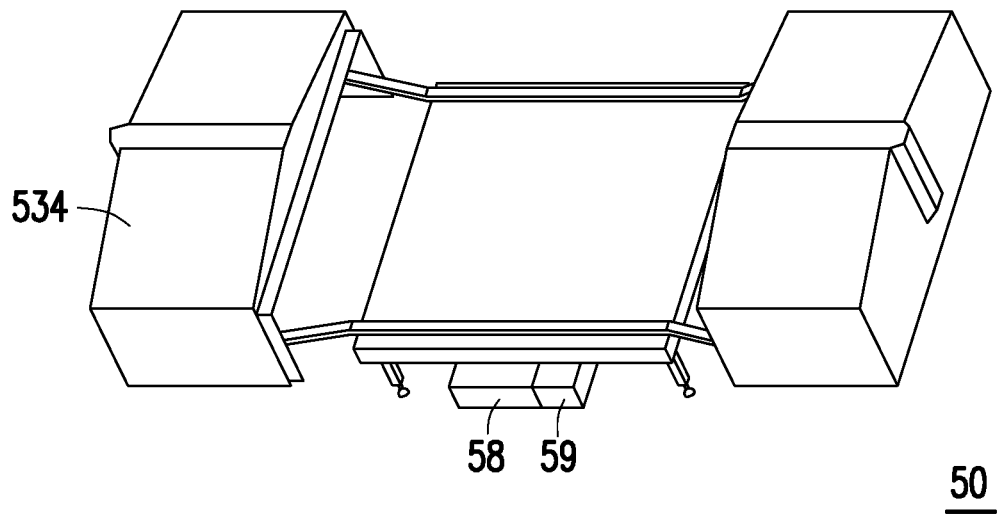
Figure 5D:
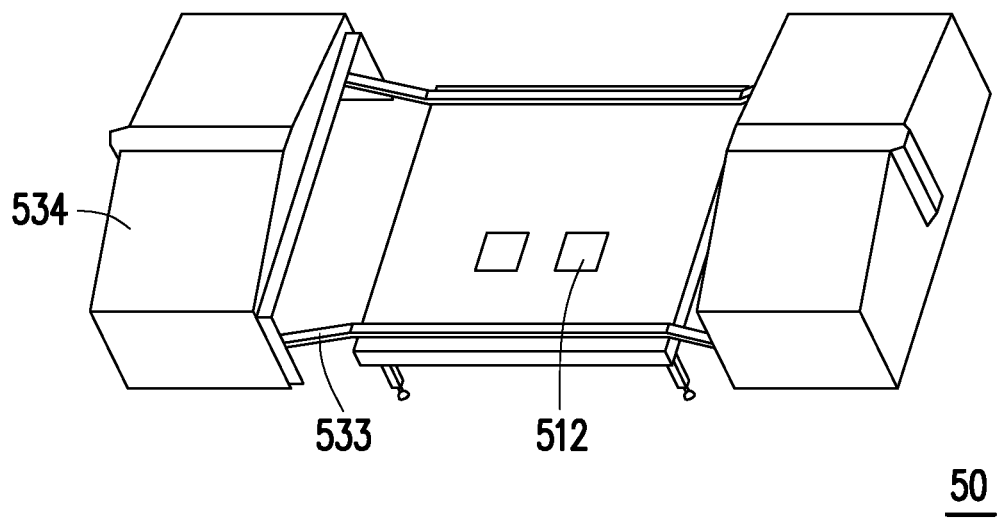
Figure 5E:
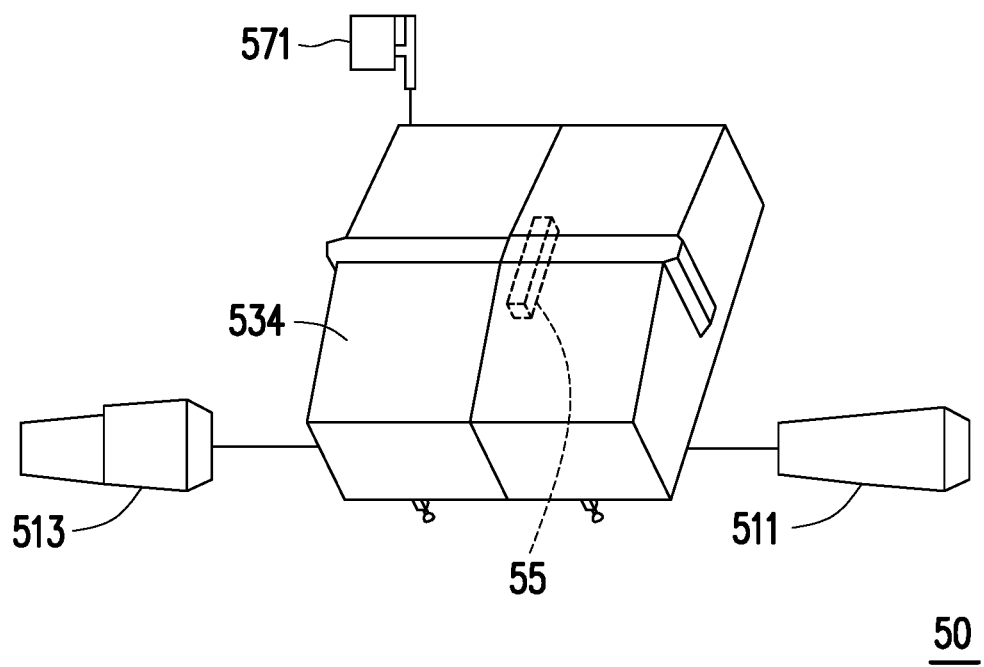

Referring to FIGS. 4, 5D and 5E, the charging device 51 includes, at least but not limited to, a power supply 511, a power supply connector 512, a backup power supply 513, and a power controller 515. The power supply 511 could be grid power, an electric generator, or a battery the same as or like the battery 11 of the drone 10. The power supply connector 512 could be a terminal, a jack, a pin, a plug, a charging pad, or other connectors, and could be exposed on the platform 532 for connecting to the charging connector 12 of the drone 10 and electrically connecting to the power supply 511. The backup power supply 513 may be an uninterruptible power system (UPS), an electric generator, a solar panel, or a combination of the two or more of the above. The power controller 515 can be a processor, a chip, or a circuit. The power controller 515 is connected to the power supply 511, the power supply connector 512, and the backup power supply 513, so that the power supply 511 supplies electric power to the connected drone 10 through the power supply connector 512, or the power controller 515 controls the backup power supply 513 to supply electric power to the drone 10.

Referring to FIGS. 4 and 5D, the positioning device 53 includes, at least but not limited to, an image sensor 531, a positioning structure 533, and a positioning processor 535. The image sensor 531 can be a camera, a video camera, or an infrared receiver. In this embodiment, the image sensor 531 receives or detects infrared lights emitted by the infrared emitter 18, and is used to determine the distance relative to the infrared emitter 18 accordingly. The positioning structure 533 can be a fixed or moveable member (e.g., a rod, bracket, etc.). The positioning processor 535 can be a processor, a chip, or a circuit. The positioning processor 535 is coupled to the image sensor 531 and the positioning structure 533 to obtain the sensing data of the image sensor 531 and control the operation of the positioning structure 533, such that the position of the drone 10 is fixed and the charging connector 12 of the drone 10 is aligned with the power supply connector 512 on the platform 532, so as to supply electric power to the drone 10.

Referring to FIGS. 4 and 5E, the temperature control system 55 includes, at least but not limited to, fans 551, a temperature detector 553, a heating device 555, and a temperature control processor 557. The fans 551 may include a axial-flow fan, a centrifugal fan, an interleaving fan, or other types of fan to allow air to flow. The temperature detector 553 can be disposed in the inner space formed by the protective covers 534 as shown in FIG. 5A to detect the temperature of the inner space. The heating device 555 may be a type of heater using infrared radiation, electromagnetic, electrical resistance or the like, a heating sheet, a heating rod, a heating plate, or a combination thereof, and the heating device 555 may be disposed under the platform 532 or disposed around the protective covers 534. The temperature control processor 557 may be a processor, a chip or a circuit. The temperature control processor 557 is connected to the fans 551, the temperature detector 553, and the heating device 555, so that the temperature control processor 557 may obtain the temperature detected by the temperature detector 553, so as to control the fans 551 and the heating device 555 to be powered on or powered off.

Referring to FIGS. 4 and 5E, the environmental monitoring system 57 includes, at least but not limited to, an external sensor 571 and an environmental control processor 573 disposed outside the base station 50. The external sensor 571 can be various sensors of temperature, wind speed, precipitation, image, atmospheric pressure, humidity, and the like. The environmental control processor 573 can be a processor, a chip, or a circuit. The environmental control processor 573 is connected to the external sensor 571 to receive the sensing data generated by the external sensor 571 (e.g., temperature, wind speed, precipitation, etc.).

Referring to FIGS. 4 and 5C, the control device 58 is disposed in the base station 50 and in a space below the platform 532. The control device 58 may be a microcomputer, a workstation, and the control device 58 includes, at least but not limited to, a storage device 581 and a processor 583. The storage device 581 could be any type of fixed or removable random access memory (RAM), read-only memory (ROM), flash memory (flash memory) or the like or a combination thereof. The storage device 581 is used to store temporary or permanent data, sensed data, control commands, etc., and the details thereof are to be described in detail in subsequent embodiments. The implementation of the processor 583 may be referred to the processor 19, and details thereof are omitted. The processor 583 is connected to the storage device 581 to access data stored in the storage device 581. The implementation of the communication transceiver 59 may be referred to the communication transceiver 15, and details thereof are omitted. The processor 583 is coupled to the communication transceiver 59 for communication with the drone 10 via the communication transceiver 59. The processor 583 also controls communication among the various devices and systems 51-57.

It should be noted that, in some embodiments, some or all of the power controller 515, the positioning processor 535, the temperature control processor 557, the environmentally controlled processor 573, and the processor 583 of the base station 50 may be integrated, to control the operation of the corresponding devices or system 51-57. In addition, appearances, numbers, and positions of the devices shown in FIGS. 5A-5E may be changed according to requirements, and any modification is not limited in the embodiments of the present disclosure.

In order to facilitate the understanding of the operation flow of the embodiment of the present disclosure, the operation procedure of the monitoring system 1 in the embodiment of the present disclosure will be described in detail below. Hereinafter, the method described in the embodiments of the present disclosure will be described in conjunction with various devices in the monitoring system 1, the drone 10, and various components and modules of the base station 50. The various processes of the method may be adjusted according to the implementation situation, and are not limited thereto.

Figure 6:
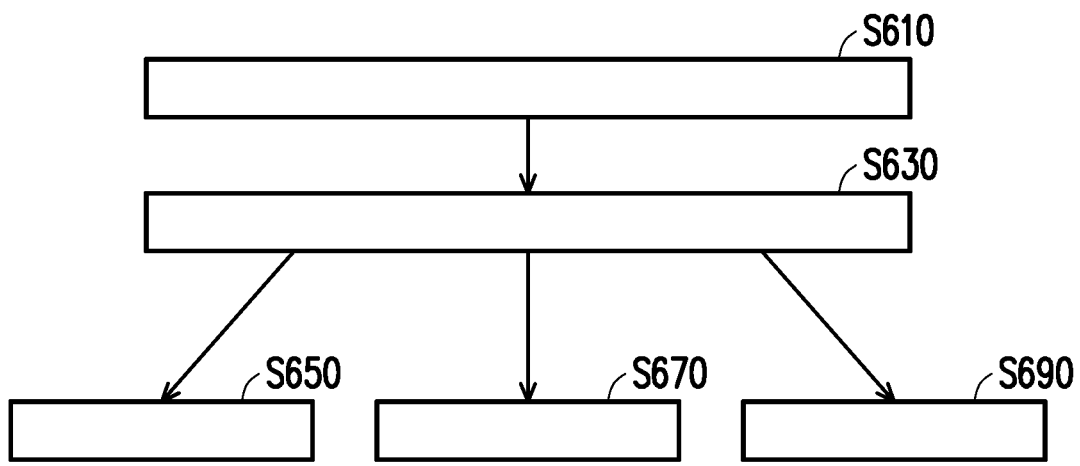
FIG. 6 is a flow chart of a monitoring method of the monitoring system according to an embodiment of the present disclosure.
Figure 7A:
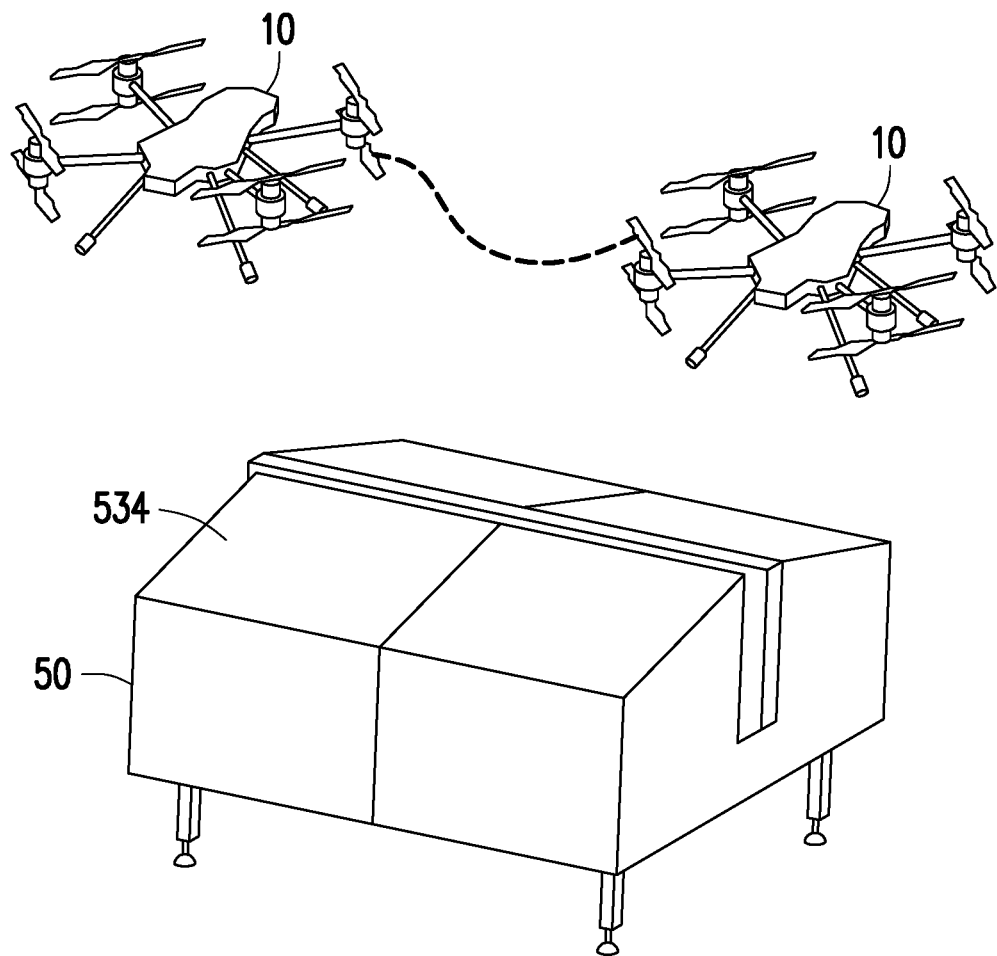
FIGS. 7A-7F is schematic diagrams showing the positioning process of the drone according to an embodiment of the present disclosure.
Figure 7B:
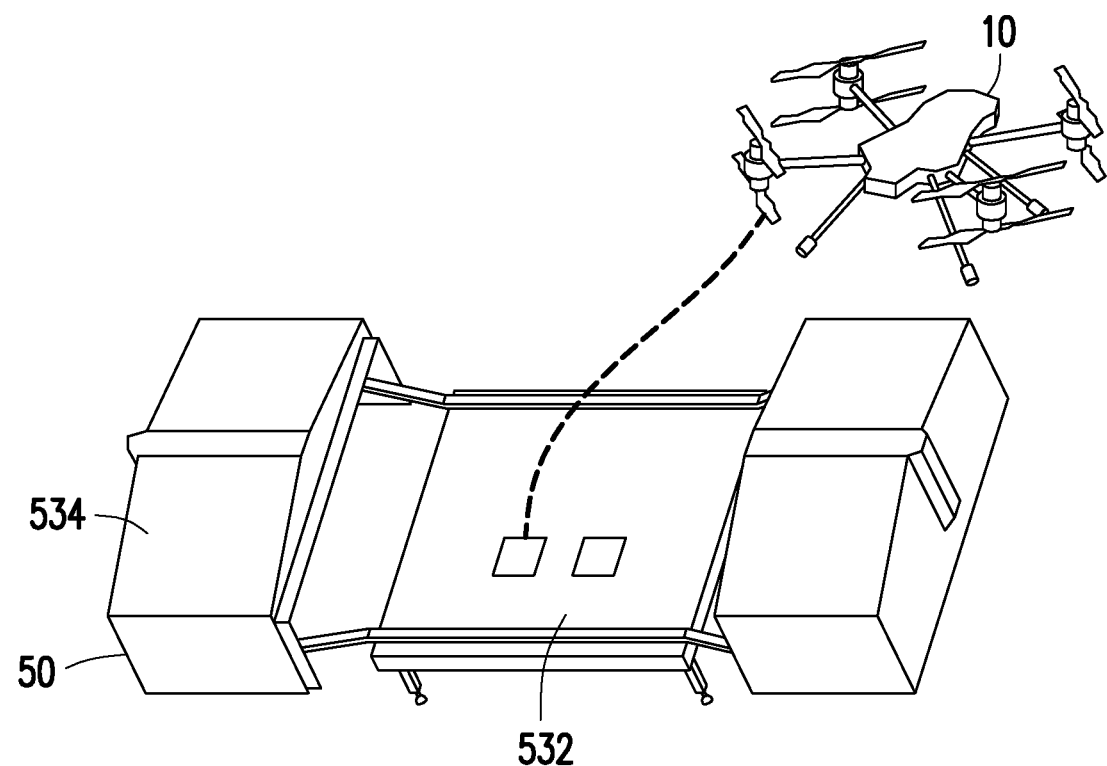

FIG. 6 is a flow chart of a monitoring method of the monitoring system 1 according to an embodiment of the present disclosure. Referring to FIG. 6, when the drone 10 is landed on the platform 532 of the base station 50, the power controller 515 is used to determine the battery specification of the battery 11 of the drone 10 based on the contact connection of the power supply connector 512 of the base station 50 and the charging connector 12 (Step S610). Specifically, taking FIGS. 8A and 8B as an example, the platform 532 of the base station 50 is provided with two charging boards 512A and 512B (forming the power supply connector 512), and the drone 10 is provided with charging terminals 12A and 12B extending downward (forming the charging connector 12). When the drone 10 is landed on the platform 532, the drone 10 is moved to a fixed position by using the positioning structure 533 such that the charging connector 12 is connected to the power supply connector 512 (as shown in FIG. 7F). The power controller 515 can be used to determine whether the charging connector 12 and the power supply connector 512 are conducted by using a specific chip, an integrated circuit, a circuit, or additional electric power sensors. After the charging connector 12 and the power supply connector 512 are confirmed to be in conduction (i.e., electrical connection), the power controller 515 starts an automated charging program and detects the electrical characteristics (e.g., voltage, current, impedance, polarity, etc.) of the current through the power supply connecter 512, so as to determine the battery specification (for example, cell property, capacity, support voltage or current, charging mode, fast charge function, remaining electricity, etc.) of the battery 11 of the drone 10. For example, a sensing resistor is disposed with the power controller 515 for measuring the charging current. The power controller 515 can calculate the electricity information of the battery 11 (the amount of the electricity) according to the voltage difference between two ends of the sensing resistor.

Next, the power controller 515 can conduct to charge the battery 11 from the according to the battery specification (step S630). There are many ways for the power controller 515 to control the charging. In one embodiment, the power controller 515 is used to determine the electricity of the battery 11 and adjust the power supply 511 to charge the battery 11 according to the remaining electricity and different battery specifications (step S650). Specifically, in order to improve the charging efficiency, during the charging process, the power controller 515 adjusts the voltage and/or current supplied from the power supply 511 according to the battery specification, as the remaining electricity of the battery 11 changes. For example, if the remaining electricity of the battery 11 reaches 80%, the charging voltage and current are lowered. When the remaining electricity of the battery 11 reaches 100%, the charging voltage and current are turned down to zero (i.e., charging is stopped).

In another embodiment, the power controller 515 is used to determine the polarity of the charging connector 12 and switches the charging polarity of the power supply connector 512 according to the polarity of the charging connector 12, such that the charging polarity of the power supply connector 512 matches the polarity of the charging connector 12. Specifically, since the battery 11 and the power supply 511 provide direct current, the power supply connector 512 and the charging connector 12 are provided with positive and negative terminals. The orientation of the drone 10 may change after landing on the platform 532, so the positive and negative poles of the power supply connector 512 may not be connected to the positive and negative poles of the charging connector 12 properly. In this embodiment, before electric power is supplied from the power supply 511, the power controller 515 is used to determine whether the polarity of the positive and negative terminals of the charging connector 12 matches the charging polarity of positive and negative terminals of the connected power supply connector 512, respectively. If the polarity are different from the charging polarity (not matched), the power controller 515 can change the charging polarity of the power supply connector 512 via a switching circuit or a chip configuration. For example, the positive terminal is switched to be a negative pole, and the negative terminal is switched to be a positive pole. If the polarity of the charging connector 12 is the same as (or matched with) the charging polarity of the power supply connector 512, the power supply connector 512 activates the power supply 511 to charge the battery 11. Thereby, a charging failure or a short circuit caused by a polarity error of the charging connector 12 could be prevented.

In another embodiment, the power controller 515 of the charging device 51 is used to determine whether the power supply 511 is in an abnormal situation for charging the battery 11, and the electric power may be stopped from being supplied from the power supply 511 according to the abnormal situation. Specifically, during the charging process, abnormal situations, such as a high temperature, an excessive current, and a short circuit, may occur. When the power controller 515 detects these abnormal situations, which can be evaluated according to the electric property and the battery specification, the power controller 515 can stop supplying electric power (for example, the voltage or the current may be reduced to zero). When the power controller 515 does not detect any abnormal situation, the electric power can be supplied again.

It should be noted that, in some embodiments, the base station 50 may utilize a wireless charging technology to provide electric power for the battery 11 of the drone 10, and the drone 10 and the base station 50 need to be installed with wireless charging devices corresponding to each other. Alternatively, the battery 11 of the drone 10 is separable, and the base station 50 is provided with a robotic arm to remove the battery 11 of the drone 10 and replace the battery 11 with another fully charged battery stored at the base station 50.

In addition to the aforementioned charging functions, the monitoring system 1 may perform other functions described below.

Regarding communication and remote control functions, referring to FIG. 3, the sensor 13 of the drone 10 obtains sensing data, or the satellite locator 17 can obtain the location information of the drone 10. In accordance with different types of the sensor 13, the sensing data may be information such as images, temperatures, air pressures, electricity, etc. The processor 19 of the drone 10 can transmit the obtained sensing data and the location information of the drone 10 by using the communication transceiver 15. The monitoring server 30 and/or the base station 50 can receive the sensing data and location information provided by the drone 10, and the monitor server 30 and/or the base station 50 can transmit a control command. The control command may be obtained by an input device of the monitoring server 30 in accordance with operations of the monitoring personnel, or the control command may be a pre-defined rule of the monitoring server 30 and the base station 50. The control command is, for example, a command of moving to a specific location, taking a photo at a specific time, a patrolling path, etc., depending on the needs of the application. The communication transceiver 15 of the drone 10 receives the control command, so that the drone 10 operate in accordance with the control command. When the drone 10 detects an abnormality in the monitoring area, the drone 10 may report a message and notify the monitoring server 30. Then, the monitoring personnel can switch the monitoring server 30 to a manual mode, to operate the drone 10 to perform a corresponding disposal procedure. The monitoring server 30 and/or the base station 50 can further back up, analyze or integrate the sensing data from the drone 10, and the monitoring server 30 can also present the analysis results to the monitoring personnel using a display. In addition, the monitoring server 30 can also remotely and real-timely control the operations of the devices and systems 51-59 in the base station 50 and obtain operation status information.

Regarding the positioning function, the process that the drone 10 returns to the base station 50 and lands on the landing platform 532 may include three sub-processes according to the embodiment of the present disclosure. Referring to FIG. 7A, the first sub-process is satellite positioning. When the area monitoring procedure or other pre-determined process of the drone 10 is finished, the satellite locator 17 obtains the location information of the drone 10, and the processor 19 controls the drone 10 to move and fly above the base station 50 according to the location information of the drone 10 and the base station 50. Then, the drone 10 flies to a position away from the top side of the protective cover 534 of the base station 50 by a height greater than a certain distance, such as 15, 20 or 30 meters. Referring to FIG. 7B, the second sub-process is infrared positioning. When the drone 10 descends to a position away from the top of the base station 50 by a height less than the certain distance, such as 15, 20, or 30 meters, the processor 19 switches the positioning mode to the infrared positioning. The image sensor 531 of the base station 50 detects the infrared light emitted by the infrared emitter 18, and the positioning processor 535 obtains the relative position of the drone 10 according to the received infrared light. The positioning processor 535 transmits a control command related to movement of the drone 10 via the communication transceiver 59, to control the drone 10 to move toward the platform 532 and finally land on the platform 532 of the base station 50.

Figure 7C:
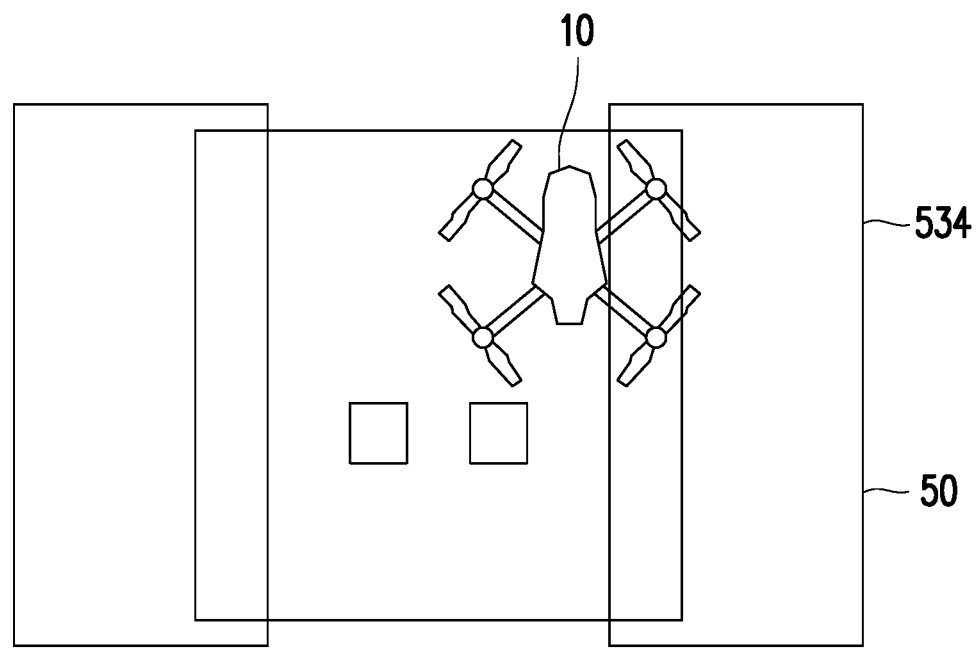
Figure 7D:
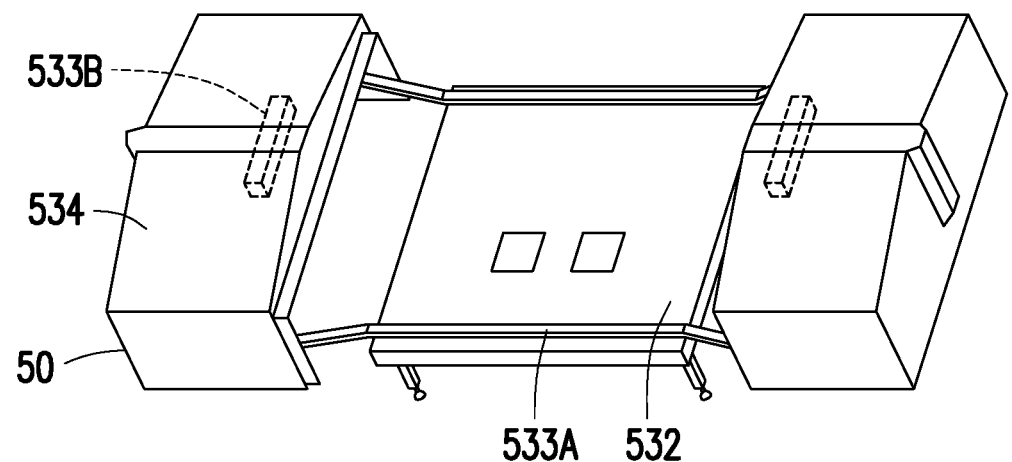
Figure 7E:
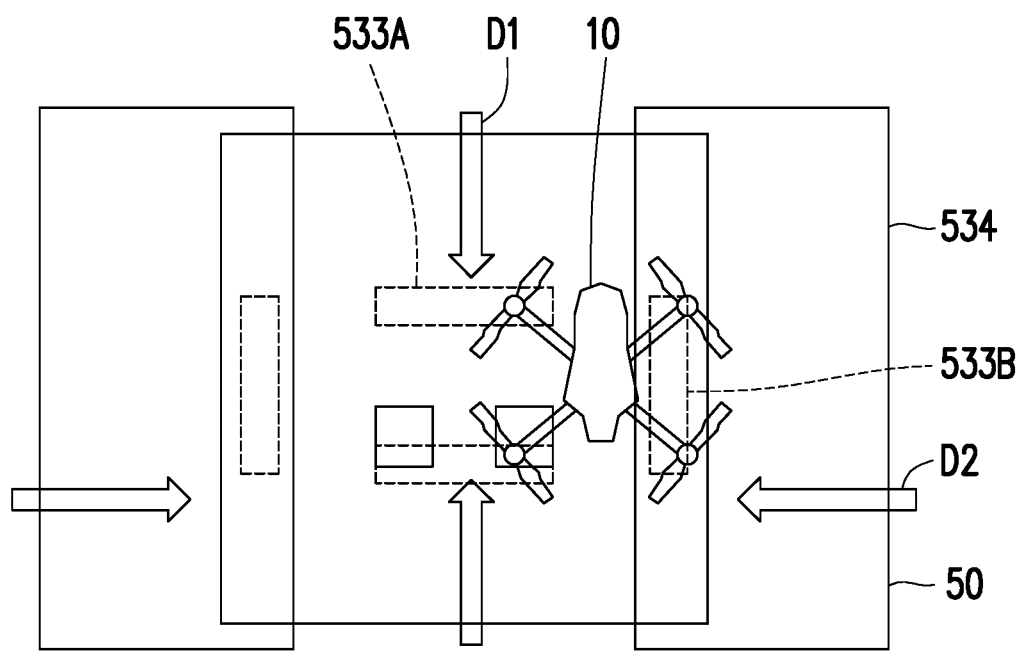
Figure 7F:
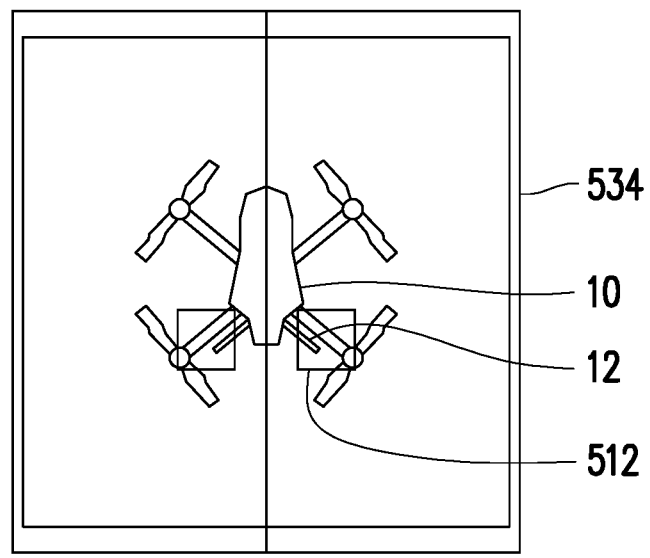
Figure 8A:
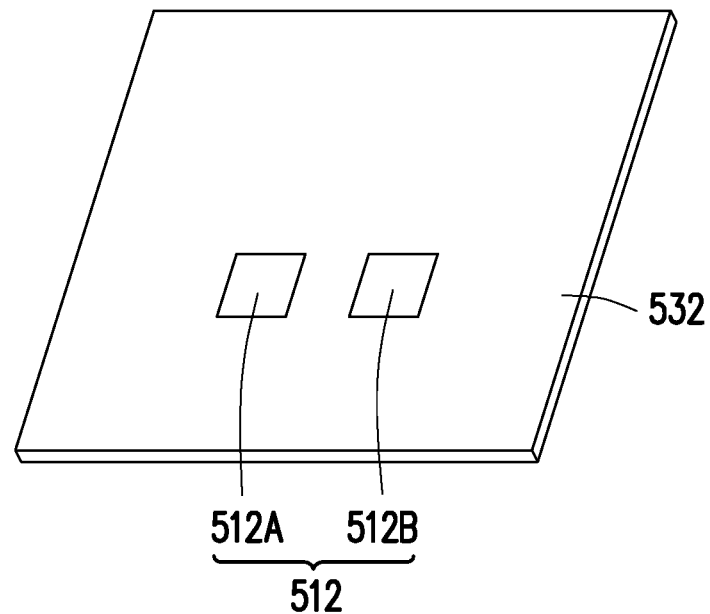
FIG. 8A is a schematic diagram of a power supply connector of the base station according to an embodiment of the present disclosure.
Figure 8B:
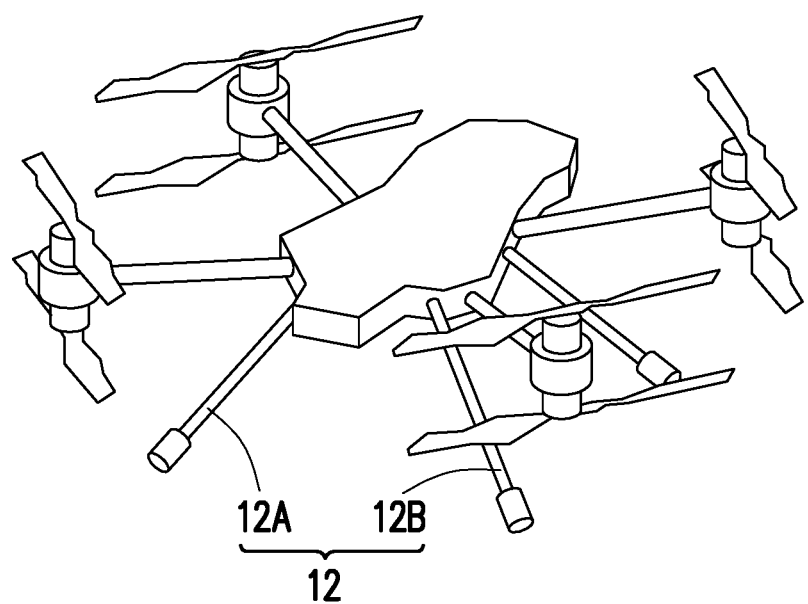
FIG. 8B is a schematic diagram of a charging connector of the drone according to an embodiment of the present disclosure.

Referring to FIG. 7C, due to outside crosswind, a landing position of the drone 10 may not be accurately located in a charging position (where the charging connector 12 of the drone 10 is connected to the power supply connector 512 as shown in FIG. 7F). Then, the drone 10 has to be moved to the charging position by using the positioning structure 533 on the base station 50. Referring to FIG. 7D, the third sub-process is structure positioning. The left and right directions of the drawing are defined as a lateral direction (i.e., the Y axis), and the up and down directions of the drawing are defined as a longitudinal direction (i.e., the X axis). The positioning structure 533 includes longitudinal moving members 533A longitudinally movably disposed on the platform 532, and lateral moving members 533B laterally movably disposed on the platform 532. The structure positioning includes two steps, where the first step is Y-axis positioning, and the second step is X-axis positioning. Referring to FIGS. 7D, 7E and 7F, the longitudinal moving members 533A are fixed with the protective covers 534 and may be moved together with the protective cover 534. The lateral moving members 533B are fixed with the protective cover 534 and may be moved together with the protective covers 534. In the process that the positioning processor 535 controls the protective covers 543 to be closed toward the opposite directions D2, the protective cover 534 drives the longitudinal moving members 533A to move in the opposite directions D1 (perpendicular to the opposite directions D2), and the drone 10 is pushed into the center of the platform 532 in the Y-axis direction. At the same time, the lateral moving members 533B are fixed with the protective cover 534. When the positioning processor 535 controls the protective covers 534 to be closed, the lateral moving members 533B push the drone 10 toward the center of the platform 532 in the X-axis direction. Finally, as shown in FIG. 7F, the power supply connector 512 contacts and connects with the charging connector 12.

In other embodiments, the positioning structure 533 on the base station 50 can be designed as different structures. For example, the left and right directions of the drawing are defined as the lateral direction (i.e., the Y axis), and the up and low directions of the figure are defined as longitudinal direction (i.e., X-axis). The positioning structure 533 includes longitudinal moving members 533A longitudinally movably disposed on the platform 532, and laterally moving members 533B laterally movably disposed on the platform 532. The longitudinal moving members 533A and the lateral moving members 533B are driven by two motors, respectively. Before the positioning processor 535 controls the process in which the protective covers 543 are closed toward the opposite directions D2, the longitudinal moving members 533A move toward the opposite directions D1 (perpendicular to the opposite directions D2) to push the drone 10 toward the center of the platform 532 in the Y-axis direction, and the lateral moving members 533B push the drone 10 toward the center of the platform 532 in the X-axis direction.

In addition, after the protective covers 534 of the base station 50 are closed, the positioning processor 535 turns on the infrared emitter 18 on the drone 10, so that the positioning processor 535 knows the relative position of the drone 10, and the drone 10 is exactly placed at the charging position. Next, the processor 19 activates break switch for the battery 11 on the drone 10. In addition, the drone 10 also notifies the base station 50 to activate a charging switch for charging.

Figure 9A:
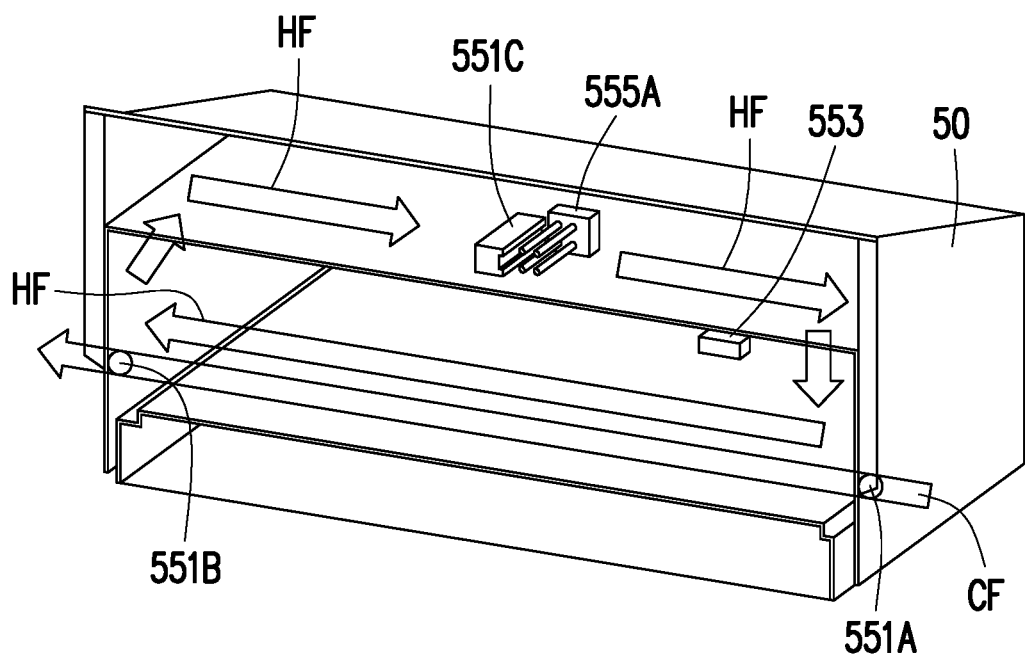
FIGS. 9A and 9B are schematic views of a temperature control system in accordance with an embodiment of the present disclosure.
Figure 9B:
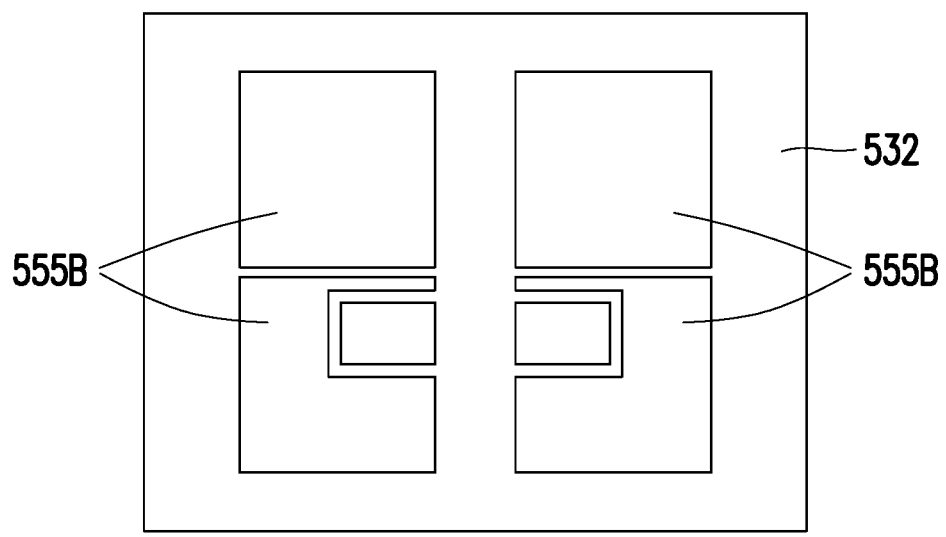

Regarding a temperature control function, referring to FIGS. 4, 9A and 9B. In this embodiment, the fans 551 includes an intake fan 551A disposed at one side of the base station 50, an exhaust fan 551B disposed at another side of the base station 50, and a lateral flow fan 551C disposed above the platform 532. The heating device 555 includes a heater 555A disposed above the platform 532, and heating pads 555B disposed on the platform 532. The temperature detector 553 obtains the inner temperature of the inner space (which is the space formed inside the base station 50 as shown in FIG. 9A) of the base station 50. The temperature control processor 557 is used to control the powers and the amount of the air flow of the fans 551A, 551B and/or 551C, to control the heating device 555 to be powered on or off, and to control the heating time of the heating device 555 according to the inner temperature, so that the heater 555A and/or the heating pad 555B of the heating device 555 may generate thermal energy.

Regarding different inner temperatures of the inner space of the base station 50, the temperature control processor 557 has different corresponding control modes. Regarding a high temperature environment, when the temperature detector 553 detects that the inner temperature is higher than a high temperature threshold (the preset threshold), the temperature control processor 557 turns on the intake fan 551A and the exhaust fan 551B to form a heat dissipation airflow CF. Therefore, the heat in inner space of the base station 50 is dissipated. Regarding a low temperature environment, when the temperature detector 553 detects that the inner temperature is lower than a low temperature threshold, the temperature control processor 557 turns off (or does not start) the intake fan 551A and the exhaust fan 551B, and turns on the heating pad 555B. The heating pad 555B generates thermal energy to heat the inner space of the base station 50. Regarding an extreme cold environment, when the temperature detector 553 detects that the inner temperature is less than an extreme cold threshold, the temperature control processor 557 may open the lateral flow fan 551C and the heater 555A, or simultaneously turn on the heating pad 555B. The hot air generated by the heater 555A flows into the inner space of the base station 50 through the lateral flow fan 551C and returns to the lateral flow fan 551C, so that the hot air flow HF is thermally circulated in the inner space of the base station 50. Thereby, the inner structure of the base station 50 can be prevented from being frozen, and problems that the protective covers 534 cannot be opened can be avoided. If the outside of the base station 50 begins to snow, hot air is conducted to the protective covers 534, which also prevents snow from accumulating on the protective covers 534 and a damage on the protective cover 534 may be avoided.

Regarding the environmental monitoring function, the external sensor 571 acquires environmental sensing data (for example, precipitation, wind speed, humidity, temperature, etc.) outside the base station 50. The environmentally controlled processor 573 controls the operation of the drone 50 or other devices or systems 51-55, 59 based on environmental sensing data. For example, when the external sensor 571 detects that a wind speed is higher than a wind speed threshold, the environmental control processor 573 sends a control command via the communication transceiver 59 to control the drone 10 to continue to stay on the platform 532 without performing a patrol task. Alternatively, the positioning processor 535 may continuously close the protective covers 534, so that the drone 10 may be fixed on the positioning structure 533. When the drone 10 is in flight, if the external sensor 571 detects that the precipitation is greater than a rainfall threshold, the environmental control processor 573 sends a control command via the communication transceiver 59 of the control device 58, so that the drone 10 can return to the base station 50 or land at other base stations 50. There are many applications for the environmental monitoring, and the person who utilizes the embodiments of the disclosure can adjust applications according to the needs.

In addition, regarding a back-up power supply function, the base station 50 is installed with a UPS, an electric generator, a solar panel, or a combination thereof depending on the situations in use. When a situation that the power supply 511 loses its electric power occurs, the UPS is first enabled, such that the cruise monitoring system of the base station 50 does not crash due to a momentary power outage. Subsequently, the electric generator is started, to continue to provide electric power, and the system operation can be maintained. In addition, the base station 50 can also use solar panels as a continuous source of electric power.

In summary, the base station of the embodiment of the present disclosure can be used to determine the battery specification of the drone and adjust the charging characteristics according to the battery specification, thereby providing a high-efficiency charging. In addition, the charging polarity of the base station is automatically adjusted according to the polarity of the charging connector of the drone, thereby the charging protection may be enhanced and the short circuit problem caused by error charging of incorrect polarity when the drone is landing may be avoided. Moreover, the embodiments of the present disclosure improve the accuracy of the landing of the drone through three positioning modes of satellite, infrared, and mechanical mechanism. The base station is equipped with fans and heating devices, to be adapted to different temperatures. The drone can also automatically cruise and automatically charge. Since the base station is set in an outdoor environment, external weather situations may affect the stability of the drone during cruise. With the environmental monitoring system, the base station may be able to evaluate climatic situations of the external environment and automatically adjust the most suitable cruise parameters for the drone. Furthermore, instead of the monitoring personnel, the embodiments of the present disclosure may perform the uninterrupted automated area monitoring. In order to avoid the situation that the base station of drone stops working in case that the electric power is lost, the base station is installed with a back-up power supply, such that the operation of the monitoring system may be continued.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A monitoring system, comprising:
   a drone, comprising a battery, wherein the battery is used for supplying electric power for the drone, and the battery is adapted to connect with a charging connector; and
   a base station, comprising:
      a charging device, comprising:
         a power supply connector, adapted to connect to the charging connector;
         a power supply, adapted to provide electric power; and
         a power controller, coupled to the power supply and the power supply connector, wherein the power controller is used to determine a battery specification of the battery and charge the battery from the power supply according to the battery specification,
      wherein the drone further comprises:
      a satellite locator, configured to obtain a location information of the drone, so that the drone is moved to the base station according to the location information; and
      an infrared emitter, emitting an infrared light,
      wherein the base station further comprises a positioning device, the positioning device comprising:
         an image sensor, detecting the infrared light;
         a positioning processor, coupled to the image sensor, and controlling the drone to be landed on a platform of the base station according to the infrared light;
         a positioning structure, coupled to the positioning processor, wherein the positioning structure comprises at least one longitudinal moving member longitudinally movably disposed on the platform and at least one lateral moving member laterally movably disposed on the platform, and the positioning processor controls the longitudinal moving member and the lateral moving member to push the drone to connect the charging connector of the drone to the power supply connector; and
         two protective covers, wherein the protective covers are disposed on the base station and laterally moved relative to the platform and the at least one longitudinal moving member and the at least one lateral moving member are fixed with the protective covers and moved together with the protective covers.

2. The monitoring system of claim 1, wherein the power controller is used to determine a capacity of the battery and adjust a power characteristic of the power supply to charge the battery according to the capacity and the battery specification.

3. The monitoring system of claim 1, wherein the power controller is used to determine a polarity of the charging connector and switch a charging polarity of the power supply connector according to the polarity of the charging connector, so that the polarity of the charging connector matches the charging polarity of the power supply connector.

4. The monitoring system of claim 1, wherein the power controller is used to determine whether the power supply is in an abnormal situation for charging the battery and stop providing the electric power from the power supply according to the abnormal situation.

5. The monitoring system of claim 1, wherein the charging connector comprises two charging terminals, and the power supply connector includes two charging boards.

6. The monitoring system of claim 1, wherein
the drone further comprises:
   at least one sensor, obtaining sensing data; and
   a communication transceiver, coupled to the at least one sensor, and transmitting the sensing data; and
wherein the monitoring system further comprises:
   a monitoring server, wherein one of the monitoring server and the base station receives the sensing data and transmits a control command, and the communication transceiver of the drone receives the control command, so that the drone is operated according to the control command.

7. The monitoring system of claim 1, further comprising:
a temperature control system, wherein the temperature control system comprising:
   at least one fan;
   a temperature detector, obtaining an inner temperature of an inner space of the base station;
   a heating device, generating thermal energy; and
   a temperature control processor, coupled to the at least one fan, the temperature detector and the heating device, and controlling the at least one fan and the heating device to be powered on or powered off according to the inner temperature.

8. The monitoring system of claim 1, wherein
the base station further comprises an environmental monitoring system, the environmental monitoring system comprising:
   at least one external sensor, acquiring environmental sensing data outside the base station; and an environmental control processor, controlling an operation of the drone according to the environmental sensing data.

9. The monitoring system of claim 1, wherein the charging device further comprises a backup power supply, the backup power supply comprising at least one of an uninterruptible power supply system, an electric generator and a solar panel.

10. A base station, comprising:
a charging device, comprising:
a power supply connector, adapted to connect a charging connector of a drone;
a power supply, adapted to provide electric power; and
a power controller, coupled to the power supply and the power supply connector, wherein the power controller is used to determine a battery specification of a battery of the drone and charge the battery of the drone from the power supply according to the battery specification;
a positioning device, comprising:
an image sensor, detecting an infrared light emitted by the drone;
a positioning processor, coupled to the image sensor, and controlling the drone to be landed on a platform of the base station according to the infrared light;
a positioning structure, coupled to the positioning processor, wherein the positioning structure comprises at least one longitudinal moving member longitudinally movably disposed on the platform and at least one lateral moving member laterally movably disposed on the platform, and the positioning processor controls the longitudinal moving member and the lateral moving member to push the drone, to connect the charging connector of the drone to the power supply connector; and
two protective covers, wherein the protective covers are disposed on the base station and laterally moved relative to the platform and the at least one longitudinal moving member and the at least one lateral moving member are fixed with the protective covers and moved together with the protective covers.

11. The base station of claim 10, wherein the power controller is used to determine a capacity of the battery of the drone and adjust a power characteristic of the power supply to charge the battery of the drone according to the capacity and the battery specification.

12. The base station of claim 10, wherein the power controller is used to determine a polarity of the charging connector and switch a charging polarity of the power supply connector according to the polarity of the charging connector, so that the polarity of the charging connector matches the charging polarity of the power supply connector.

13. The base station of claim 10, wherein the power controller is used to determine whether the power supply is in an abnormal situation for charging the battery and stop providing the electric power from the power supply according to the abnormal situation.

14. The base station of claim 10, wherein the charging connector comprises two charging terminals, and the power supply connector includes two charging boards.

15. The base station of claim 10, wherein the base station receives sensing data from the drone and transmits a control command, so that the drone is operated according to the control command.

16. The base station of claim 10, further comprising a temperature control system, wherein the temperature control system comprising:
at least one fan;
a temperature detector, obtaining an inner temperature of an inner space of the base station;
a heating device, generating thermal energy; and
a temperature control processor, coupled to the at least one fan, the temperature detector and the heating device, and controlling the at least one fan and the heating device to be powered on or powered off according to the inner temperature.

17. The base station of claim 10, further comprising:
an environmental monitoring system, comprising:
at least one external sensor, acquiring environmental sensing data outside the base station; and
an environmental control processor, controlling an operation of the drone according to the environmental sensing data.

18. The base station of claim 10, wherein the charging device further comprises a backup power supply, the backup power supply comprising at least one of an uninterruptible power supply system, an electric generator and a solar panel.

19. A control method, adapted for a base station, and the control method comprising:
determining a battery specification of a battery of a drone;
charging a battery of the drone according to the battery specification;
detecting an infrared light emitted by the drone;
controlling the drone to be landed on a platform of the base station according to the infrared light; and
controlling at least one longitudinal moving member and at least one lateral moving member disposed on the platform to push the drone, to connect a charging connector of the drone with a power supply connector,
wherein two protective covers are disposed on the base station and laterally moved relative to the platform and the at least one longitudinal moving member and the at least one lateral moving member are fixed with the protective covers and moved together with the protective covers.

20. The control method of claim 19, wherein the step of charging the battery of the drone according to the battery specification comprises:
determining a capacity of the battery of the drone; and
adjusting a power characteristic for charging the battery of the drone according to the capacity and the battery specification.

21. The control method of claim 19, wherein the step of charging the battery of the drone according to the battery specification comprises:
providing the power supply connector for connecting the charging connector of the drone;
determining a polarity of the charging connector; and
switching a charging polarity of the power supply connector according to the polarity of the charging connector, so that the polarity of the charging connector matches the charging polarity of the power supply connector.

22. The control method of claim 19, wherein the step of charging the battery of the drone according to the battery specification comprises:
determining whether a charging of the battery is in an abnormal situation; and
stopping providing electric power according to the abnormal situation.

23. The control method of claim 21, wherein the charging connector comprises two charging terminals, and the power supply connector includes two charging boards.

24. The control method of claim 19, further comprising:
backing up or analyzing sensing data from the drone; and
transmitting a control command, so that the drone is operated according to the control command.

25. The control method of claim 19, further comprising:
obtaining an inner temperature of an inner space of the base station; and
controlling a fan and a heating device to be powered on or powered off according to the inner temperature.

26. The control method of claim 19, further comprising:
acquiring environmental sensing data outside the base station; and
controlling an operation of the drone according to the environmental sensing data.

27. The control method of claim 19, further comprising:
providing a backup power supply, wherein the backup power supply comprises at least one of an uninterruptible power supply system, an electric generator and a solar panel.

* * * * *